US012713380B2

(12) United States Patent
Rune et al.

(10) Patent No.: US 12,713,380 B2

(45) Date of Patent: Aug. 18, 2026

(54) MEASUREMENT GAPS FOR SYNCHRONIZATION SIGNAL BLOCK MEASUREMENT TIME CONFIGURATION WINDOWS IN NON-TERRESTRIAL NETWORKS

(71) Applicant: Telefonaktiebolaget LM Ericsson (PUBL), Stockholm (SE)

(72) Inventors: Johan Rune, Lidingö (SE); Helka-Liina Määttänen, Espoo (FI); Sebastian Euler, Storvreta (SE); Emre Yavuz, Stockholm (SE); Chao He, Sollentuna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 292 days.

(21) Appl. No.: 18/262,638

(22) PCT Filed: Jan. 24, 2022

(86) PCT No.: PCT/IB2022/050602

§ 371 (c)(1),
(2) Date: Jul. 24, 2023

(87) PCT Pub. No.: WO2022/157735

PCT Pub. Date: Jul. 28, 2022

(65) Prior Publication Data

US 2024/0114474 A1 Apr. 4, 2024

Related U.S. Application Data

(60) Provisional application No. 63/141,207, filed on Jan. 25, 2021.

(51) Int. Cl.

*H04W 64/00* (2009.01)
*H04L 5/00* (2006.01)

(Continued)

(52) U.S. Cl.

CPC ........... *H04W 64/00* (2013.01); *H04L 5/0051* (2013.01); *H04W 24/10* (2013.01); *H04W 84/06* (2013.01)

(58) Field of Classification Search

CPC ..... H04W 64/00; H04W 24/10; H04W 84/06; H04W 56/004; H04W 56/006; H04L 5/0051; H04B 7/18508

See application file for complete search history.

(56) References Cited

U.S. PATENT DOCUMENTS

2020/0067973 A1* 2/2020 Pivetta ................ H04L 63/1441
2022/0039039 A1* 2/2022 Maattanen .......... H04W 56/006

(Continued)

FOREIGN PATENT DOCUMENTS

JP 2023-545799 A2 10/2023
WO WO-2020067973 A1 * 4/2020 ......... H04B 7/18541

OTHER PUBLICATIONS

LG Electronics, "Discussion on measurement requirements for NTN", 3GPP TSG-RAN WG4 Meeting #98-e, R4-2100646, Jan. 25-Feb. 5, 2021, 5 Pages, Electronic Meeting.

(Continued)

*Primary Examiner* — Kenneth T Lam

(74) *Attorney, Agent, or Firm* — Baker Botts L.L.P.

(57) ABSTRACT

A method (1000) performed by a wireless device (110) includes obtaining (1002) location information associated with the wireless device and/or ephemeris data for a plurality of satellite cells. The wireless device receives (1004) a measurement configuration to measure reference signals from one or more satellite cells of the plurality of satellite cells. The wireless device dynamically adapts (1006) the measurement configuration based on the location of the wireless device and/or the ephemeris data for the one or more satellite cells. Based on the adapted measurement (Continued)

configuration, the wireless device measures (1008) a reference signal from the one or more satellite cells.

20 Claims, 14 Drawing Sheets

(51) Int. Cl.
*H04W 24/10* (2009.01)
*H04W 84/06* (2009.01)

(56) References Cited

U.S. PATENT DOCUMENTS

| | | | | |
|---|---|---|---|---|
| 2022/0225132 | A1* | 7/2022 | Roy | H04W 24/08 |
| 2022/0232498 | A1* | 7/2022 | Muhammad | H04W 56/005 |
| 2022/0248282 | A1* | 8/2022 | Fu | H04L 27/2657 |
| 2022/0263569 | A1* | 8/2022 | Fan | H04W 56/001 |
| 2023/0388951 | A1* | 11/2023 | Xu | H04B 17/364 |
| 2023/0403593 | A1* | 12/2023 | Hong | H04W 56/001 |
| 2024/0031886 | A1* | 1/2024 | Li | H04W 56/001 |
| 2024/0063894 | A1* | 2/2024 | Vogedes | H04B 7/18504 |
| 2024/0080687 | A1* | 3/2024 | Xiong | H04W 48/16 |

OTHER PUBLICATIONS

Mediatek Inc., "Efficient Configuration of SMTC and Measurement Gaps in NR-NTN", 3GPP TSG-RAN WG2 Meeting #113-e, R2-2100258, Jan. 25-Feb. 5, 2021, 7 Pages, Online.

Nokia, et al., "On SMTC and measurements gaps for NTN", 3GPP TSG-RAN WG2 Meeting #113 Electronic, R2-2100530, Jan. 25-Feb. 5, 2021, 7 Pages, Elbonia.

3GPP TS 38.331 V16.3.1 (Jan. 2021); 3rd Generation Partnership Project; Technical Specification Group Radio Access Network; NR; Radio Resource Control (RRC) protocol specification (Release 16).

3GPP TR 38.821 V16.0.0 (Dec. 2019); 3rd Generation Partnership Project; Technical Specification Group Radio Access Network; Solutions for NR to support non-terrestrial networks (NTN) (Release 16).

3GPP TR 38.811 V15.4.0 (Sep. 2020); 3rd Generation Partnership Project; Technical Specification Group Radio Access Network; Study on New Radio (NR) to support non-terrestrial networks (Release 15).

3GPP TSG-RAN2 Meeting #108; Reno, USA; Nov. 18-22, 2019; Agenda Item: 6.6.4.3; Source: Huawei, HiSilicon; Title: Discussion on SSB measurement in NTN (R2-1915189).

3GPP TSG RAN meeting #86; Sitges, Spain, Dec. 9-13, 2019; Source: Thales; Title: Solutions for NR to support non-terrestrial networks (NTN); Agenda Item: 9.1.2—Proposals led by RAN2; Release Rel-17 (RP-193234 (revision from RP-192502 3144)).

3GPP TSG RAN Meeting #86; Sitges, Spain, Dec. 9-31, 2019; Source: MediaTek Inc.; Title: New Study WID on NB-IoT/eTMC support for NTN (RP-193235).

PCT International Search Report issued for International application No. PCT/IB2022/050602—Apr. 7, 2022.

PCT Written Opinion of the International Searching Authority issued for International application No. PCT/IB2022/050602—Apr. 7, 2022.

Patent Grant issued for Japanese Patent Application No. 2023-544605—Jan. 9, 2025 [machine translation included].

* cited by examiner

MEASUREMENT GAPS FOR SYNCHRONIZATION SIGNAL BLOCK MEASUREMENT TIME CONFIGURATION WINDOWS IN NON-TERRESTRIAL NETWORKS

TECHNICAL FIELD

The present disclosure relates, in general, to wireless communications and, more particularly, systems and methods for measurement gaps for Synchronization Signal Block Measurement Time Configuration (SMTC) in Non-Terrestrial Networks.

BACKGROUND

Third Generation Partnership Project (3GPP) specifies the Evolved Packet System (EPS). EPS is based on the Long-Term Evolution (LTE) radio network and the Evolved Packet Core (EPC). EPS was originally intended to provide voice and Mobile Broadband (MBB) services but has continuously evolved to broaden its functionality. 3GPP also specifies narrowband Internet of Things (NB-IoT) and LTE for machines (LTE-M) as part of the LTE specifications and provide connectivity to Massive Machine Type Communications (mMTC) services.

3GPP also specifies the 5G system (5GS). This is a new generation radio access technology intended to serve use cases such as Enhanced Mobile Broadband (eMBB), Ultra-Reliable and Low Latency Communication (URLLC) and mMTC. 5G includes the New Radio (NR) access stratum interface and the 5G Core Network (5GC). The NR physical and higher layers reuse parts of the LTE specification, and to that add needed components when motivated by the new use cases. One such component is a sophisticated framework for beam forming and beam management to extend the support of the 3GPP technologies to a frequency range going beyond 6 GHz.

In 3GPP Release 15, 3GPP started the work to prepare NR for operation in a Non-Terrestrial Network (NTN) (e.g., satellite communications). The work was performed within the study item "NR to support Non-Terrestrial Networks" and resulted in 3GPP TR 38.811. In 3GPP Release 16, the work to prepare NR for operation in an NTN network continued with the study item "Solutions for NR to support Non-Terrestrial Network". In parallel, the interest to adapt NB-IoT and LTE-M for operation in NTN is growing. As a consequence, 3GPP Release 17 contains both a work item on NR NTN and a study item on NB-IoT and LTE-M support for NTN.

A satellite radio access network usually includes the following components. A satellite that refers to a space-borne platform. An earth-based gateway that connects the satellite to a base station or a core network, depending on the choice of architecture. A feeder link that refers to the link between a gateway and a satellite. An access link that refers to the link between a satellite and a UE.

Depending on the orbit altitude, a satellite may be categorized as low earth orbit (LEO), medium earth orbit (MEO), or geostationary earth orbit (GEO) satellite. LEO includes typical heights ranging from 250-1,500 km, with orbital periods ranging from 90-120 minutes. MEO includes typical heights ranging from 5,000-25,000 km, with orbital periods ranging from 3-15 hours. GEO includes height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Two basic architectures have been considered. One is the transparent payload (also referred to as bent pipe architecture). In this architecture, the gNodeB (gNB) is located on the ground and the satellite forwards signals/data between the gNB and the UE. Another is the regenerative payload. In this architecture, the gNB is located in the satellite. In the work item for NR NTN in 3GPP Release 17, only the transparent architecture is considered.

FIG. 1 illustrates an example architecture of a satellite network with bent pipe transponders. The gNB may be integrated in the gateway or connected to the gateway via a terrestrial connection (wire, optic fiber, wireless link).

Propagation delay is an important aspect of satellite communications that is different from the delay expected in a terrestrial mobile system. For a bent pipe satellite network, the round-trip delay may, due to the orbit height, range from tens of ms in the case of LEO to several hundreds of ms for GEO. This can be compared to the round-trip delays catered for in a cellular network which are limited to 1 ms.

The distance between the user equipment (UE) and a satellite can vary significantly, depending on the position of the satellite and thus the elevation angle c seen by the UE. Assuming circular orbits, the minimum distance is realized when the satellite is directly above the UE (ε=90°), and the maximum distance when the satellite is at the smallest possible elevation angle. Table 1 shows the distances between satellite and UE for different orbital heights and elevation angles together with the one-way propagation delay and the maximum propagation delay difference (the difference towards ε=90°). Table 1 assumes regenerative architecture. For the transparent case, the propagation delay between gateway and satellite needs to be considered as well, unless the base station corrects for that.

TABLE 1

Propagation delay for different orbital heights and elevation angles.

| Orbital height | Elevation angle | Distance UE <—> satellite | One-way propagation delay | Propagation delay difference |
|---|---|---|---|---|
| 600 km | 90° | 600 km | 2.0 ms | — |
| | 30° | 1075 km | 3.6 ms | 1.6 ms |
| | 10° | 1932 km | 6.4 ms | 4.4 ms |
| 1200 km | 90° | 1200 km | 4.0 ms | — |
| | 30° | 1999 km | 6.7 ms | 2.7 ms |
| | 10° | 3131 km | 10.4 ms | 6.4 ms |
| 35786 km | 90° | 35786 km | 119.4 ms | — |
| | 30° | 38609 km | 128.8 ms | 9.4 ms |
| | 10° | 40581 km | 135.4 ms | 16.0 ms |

The propagation delay may also be highly variable due to the high velocity of the LEO and MEO satellites and change in the order of 10-100 μs every second, depending on the orbit altitude and satellite velocity.

In the context of propagation delay, the timing advance (TA) the UE uses for its uplink transmissions is essential and has to be much greater than in terrestrial networks for the uplink and downlink to be time aligned at the gNB, as is the case in NR and LTE. One of the purposes of the random access (RA) procedure is to provide the UE with a valid TA (which the network later can adjust based on the reception timing of uplink transmission from the UE). However, even the random access preamble (i.e., the initial message from the UE in the random access procedure) has to be transmitted with a timing advance to allow a reasonable size of the RA preamble reception window in the gNB, but this TA does not have to be as accurate as the TA the UE subsequently uses for other uplink transmissions. The TA the UE uses for the RA preamble transmission is called "pre-compensation TA". Various proposals are considered for how to determine the pre-compensation TA, all of which involves information originating both at the gNB and at the UE.

One proposal is broadcast of a "common TA" which is valid at a certain reference point, e.g., a center point in the cell. The UE then calculates how its own pre-compensation TA deviates from the common TA, based on the difference between the UE's own location and the reference point together with the position ofthe satellite. Herein, the UE acquires its own position using Global Navigation Satellite System (GNSS) measurements and the UE obtains the satellite position using satellite orbital data (including satellite position at a certain time) broadcast by the network.

According to another proposal, the UE autonomously calculates the propagation delay between the UE and the satellite based on the UE's and the satellite's respective positions, and the network/gNB broadcasts the propagation delay on the feeder link, i.e., the propagation delay between the gNB and the satellite. The UE may acquire its own position using GNSS measurements, and the UE may obtain the satellite position using satellite orbital data (including satellite position at a certain time) broadcast by the network. The pre-compensation TA is then twice the sum of the propagation delay on the feeder link and the propagation delay between the satellite and the UE.

In another proposal, the gNB broadcasts a timestamp (in SIB9), which the UE compares with a reference timestamp acquired from GNSS. Based on the difference between these two timestamps, the UE can calculate the propagation delay between the gNB and the UE, and the pre-compensation TA is twice as long as this propagation delay.

A second important aspect closely related to the timing is a Doppler frequency offset induced by the motion of the satellite. The access link may be exposed to Doppler shift on the order of 10-100 kHz in sub-6 GHz frequency band and proportionally higher in higher frequency bands. Also, the Doppler shift is varying, with a rate of up to several hundred Hz per second in the S-band and several kHz per second in the Ka-band.

A global navigation satellite system comprises a set of satellites orbiting the earth in orbits crossing each other, such that the orbits are distributed around the globe. The satellites transmit signals and data that facilitates a receiving device on earth to accurately determine time and frequency references and accurately determine its position, provided that signals are received from a sufficient number of satellites (e.g., four). The position accuracy may typically be in the range of a few meters, but using averaging over multiple measurements, a stationary device may achieve much better accuracy.

A well-known example of a GNSS is the American Global Positioning System (GPS). Other examples are the Russian Global Navigation Satellite System (GLONASS), the Chinese BeiDou Navigation Satellite System and the European Galileo.

The transmissions from GNSS satellites include signals that a receiving device uses to determine the distance to the satellite. By receiving such signals from multiple satellites, the device can determine its position. However, this requires that the device also knows the positions of the satellites. To enable this, the GNSS satellites also transmit data about their own orbits (from which position at a certain time can be derived). In GPS, such information is referred to as ephemeris data and almanac data (or sometimes lumped together under the term navigation information).

The time required to perform a GNSS measurement, e.g. GPS measurement, may vary widely, depending on the circumstances, mainly depending on the status of the ephemeris and almanac data the measuring devices has previously acquired (if any). In the worst case, a GPS measurement can take several minutes. GPS is using a bit rate of 50 bps for transmitting its navigation information. The transmission of the GPS date, time and ephemeris information takes 90 seconds. Acquiring the GPS Almanac containing orbital information for all satellites in the GPS constellation takes more than 10 minutes. If a UE already possesses this information, the synchronization to the GPS signal for acquiring the UE position and Coordinated Universal Time (UTC) is a significantly faster procedure.

3GPP NTN is dependent on GNSS. To handle the timing and frequency synchronization in a NR- or LTE-based NTN, a promising technique is to equip each device with a GNSS receiver. The GNSS receiver facilitates a device to estimate its geographical position. In one example, a NTN gNB carried by a satellite broadcasts its ephemeris data (i.e., data that informs the UE about the satellite's position, velocity and orbit) to a GNSS equipped UE. The UE can then determine the propagation delay, the delay variation rate, the Doppler shift and its variation rate based on its own location (obtained through GNSS measurements) and the satellite location and movement (derived from the ephemeris data).

The GNSS receiver also facilitates a device to determine a time reference (e.g., in terms of UTC) and frequency reference. This can also be used to handle the timing and frequency synchronization in a NR or LTE based NTN. In a second example, a NTN gNB carried by a satellite broadcasts its timing (e.g., in terms of a Coordinated Universal Time (UTC) timestamp) to a GNSS equipped UE. The UE can then determine the propagation delay, the delay variation rate, the Doppler shift, and its variation rate based on its time/frequency reference (obtained through GNSS measurements) and the satellite timing and transmit frequency.

The UE may use this knowledge to compensate its uplink transmissions for the propagation delay and Doppler effect.

With respect to NB-IoT and LTE-M for NTN, 3GPP specifications note that GNSS capability in the UE is taken as a working assumption for both NB-IoT and eMTC devices. With this assumption, a UE can estimate and pre-compensate timing and frequency offset with sufficient accuracy for uplink transmission. Simultaneous GNSS and NTN NB-IoT/eMTC operation is not assumed.

Furthermore, in the NTN work item and IoT NTN study item for 3GPP Release 17, GNSS capability is assumed. For example, it is assumed that a NTN capable UE also is GNSS capable and GNSS measurements at the UEs are essential for the operation of the NTN.

NR also includes SSB-MTC and measurement gaps. NR synchronization signal (SS) consists of primary SS (PSS) and secondary SS (SSS). NR physical broadcast channel (PBCH) carries the very basic system information. The combination of SS and PBCH is referred to as SSB in NR. Multiple SSBs are transmitted in a localized burst set. Within a SS burst set, multiple SSBs can be transmitted in different beams. The transmission of SSBs within a localized burst set is confined to a 5 ms window. The set of possible SSB time locations within an SS burst set depends on the numerology which in most cases is uniquely identified by the frequency band. The SSB periodicity can be configured from the value set {5, 10, 20, 40, 80, 160} ms.

A UE does not need to perform measurements with the same periodicity as the SSB periodicity. Accordingly, the SSB measurement time configuration (SMTC) has been introduced for NR. The signaling of SMTC window informs the UE of the timing and periodicity of SSBs that the UE can use for measurements. The SMTC window periodicity can be configured from the value set {5, 10, 20, 40, 80, 160} ms, matching the possible SSB periodicities. The SMTC window duration can be configured from the value set {1, 2, 3, 4, 5} ms.

The UE may use the same radio frequency (RF) module for measurements of neighboring cells and data transmission in the serving cell. Measurement gaps enable the UE to suspend the data transmission in the serving cell and perform the measurements of neighboring cells. The measurement gap repetition periodicity can be configured from the value set {20, 40, 80, 160} ms, the gap length can be configured from the value set {1.5, 3, 3.5, 4, 5.5, 6} ms. Usually, the measurement gap length is configured to be larger than the SMTC window duration to account for RF retuning time. Measurement gap time advance is also introduced to fine tune the relative position of the measurement gap with respect to the SMTC window. The measurement gap timing advance can be configured from the value set {0, 0.25, 0.5} ms.

FIG. 2 illustrates an example of SSB, SMTC window, and measurement gap. Section 5.5.2.10 in 3GPP TS 38.331 specifies SMTC configuration as follows:

The UE shall setup the first SS/PBCH block measurement timing configuration (SMTC) in accordance with the received periodicityAndOffset parameter (providing Periodicity and Offset value for the following condition) in the smtcl configuration. The first subframe of each SMTC occasion occurs at an SFN and subframe of the NR SpCell meeting the following condition:

```
SFN mod T = (FLOOR (Offset/10));
if the Periodicity is larger than sf5:
   subframe = Offset mod 10;
else:
   subframe = Offset or (Offset +5);
with T = CEIL(Periodicity/10).
```

If smtc2 is present, for cells indicated in the pci-List parameter in smtc2 in the same MeasObjectNR, the UE shall setup an additional SS/PBCH block measurement timing configuration (SMTC) in accordance with the received periodicity parameter in the smtc2 configuration and use the Offset (derived from parameter periodicityAndOffset) and duration parameter from the smtcl configuration. The first subframe of each SMTC occasion occurs at an SFN and subframe of the NR SpCell meeting the above condition.

If smtc2-LP is present, for cells indicated in the pci-List parameter in smtc2-LP in the same frequency (for intra frequency cell reselection) or different frequency (for inter frequency cell reselection), the UE shall setup an additional SS/PBCH block measurement timing configuration (SMTC) in accordance with the received periodicity parameter in the smtc2-LP configuration and use the Offset (derived from parameter periodicityAndOffset) and duration parameter from the smtc configuration for that frequency. The first subframe of each SMTC occasion occurs at an SFN and subframe of the NR SpCell or serving cell (for cell reselection) meeting the above condition.

On the indicated ssbFrequency, the UE shall not consider SS/PBCH block transmission in subframes outside the SMTC occasion for RRM measurements based on SS/PBCH blocks and for RRM measurements based on CSI-RS except for SFTD measurement (see 3GPP TS 38.133, subclause 9.3.8).

There currently exist certain challenges. For example, SMTC and the different variants thereof are efficient means to facilitate for a UE to find relevant SSB transmissions and to limit the SSB search and measurement effort in terrestrial networks. However, the special properties of NTNs impose problems that are not present in terrestrial networks and which the existing SMTC definition is not adapted to deal with.

Compared to terrestrial networks, the distances between sender and transmitter may be very long in NTNs and they may vary a lot depending on the satellite's (or HAPS'/HIBS') position in relation to the UE. In addition, cells in a NTN are typically very large, which means that the difference in satellite-UE propagation delay may differ significantly between two different locations in the same cell as compared to the SMTC offset and duration parameters.

Assuming the SSB/CSI-RS transmissions from different satellites are synchronized and transmitted at the same time, they will still arrive at the UE at different times because of the differences in distance and thus propagation delay.

If an SMTC window and a corresponding measurement gap are configured based on the timing of the serving satellite, SSB/CSI-RS transmissions from other satellites might arrive at the UE outside the configured SMTC measurement window and/or measurement gap, which means that the UE will miss the reference signals and will not be able to perform the measurements.

There is no problem if the length of the SMTC window/measurement gap is large enough so that the transmissions from all satellites fall into the window despite the different propagation delays. According to 3GPP TR 38.331, a length of up to 5 subframes and 6 subframes can be configured for the SMTC window and measurement gap, respectively. Comparing with the values in Table 1, it can be seen that this is barely enough for the 600 km case. For the 1200 km case, it works only if a minimum elevation angle of 30° is assumed. For GEO, the propagation delay difference is larger than the SMTC window/measurement gap in all cases. What complicates the problem is that the propagation delay differences will shift with the movement of the satellites.

FIG. 3 illustrates propagation delay differences. Specifically, in the example shown in FIG. 3, there are two satellites S1 and S2, in a 1200 km orbit. At t=0, S1 is directly above the UE while S2 is at an elevation angle of 30°. The propagation delays are 4 ms and 6.7 ms, respectively. Signals transmitted at the same time arrive 2.7 ms earlier from S1 than from S2. At t=1, the UE sees both satellites under an elevation angle of 60°, and the propagation delay is 4.5 ms towards both S1 and S2. At this point, signals transmitted at the same time also arrive at the same time at the UE. Finally, at t=2, the situation is reversed compared to t=0. Now signals from S2 arrive 2.7 ms earlier than from S1, if they are transmitted at the same time.

SUMMARY

Certain aspects of the present disclosure and their embodiments may provide solutions to these or other challenges.

According to certain embodiments, a method by a wireless device includes obtaining location information associated with the wireless device and/or ephemeris data for one or more satellite cells. The wireless device receives a measurement configuration to measure reference signals from the one or more satellite cells. The wireless device dynamically adapts the measurement configuration based on the location of the wireless device and/or the ephemeris data for the one or more satellite cells. Based on the adapted measurement configuration, the wireless device measures a reference signal from the one or more satellite cells.

According to certain embodiments, a wireless device is configured to obtain location information associated with the wireless device and/or ephemeris data for one or more satellite cells. The wireless device is configured to receive a measurement configuration to measure reference signals from the one or more satellite cells. The wireless device is configured to dynamically adapt the measurement configuration based on the location of the wireless device and/or the ephemeris data for the one or more satellite cells. Based on the adapted measurement configuration, the wireless device is configured to measure a reference signal from the one or more satellite cells.

According to certain embodiments, a method by a network node includes obtaining location information associated with a wireless device and/or ephemeris data for one or more satellite cells. The network node transmits, to the wireless device, a measurement configuration for the wireless device to measure reference signals from one or more satellite cells. The network node dynamically adapts the measurement configuration based on the ephemeris data for the one or more satellite cells and the location information associated with the wireless device.

According to certain embodiments, a network node is configured to obtain location information associated with a wireless device and/or ephemeris data for one or more satellite cells. The network node is configured to transmit, to the wireless device, a measurement configuration for the wireless device to measure reference signals from one or more satellite cells. The network node is configured to dynamically adapt the measurement configuration based on the ephemeris data for the one or more satellite cells and the location information associated with the wireless device.

Certain embodiments may provide one or more of the following technical advantages. For example, a technical advantage may be that certain embodiments enable accurate SMTC windows to be adapted and provided to UEs in all NTN scenarios, taking into account the UE's position, the satellites' positions, and/or the satellite's movement (including speed and direction). Particular embodiments may use either the serving satellite's/gNB's/cell's timing or GNSS timing as the time reference. As another example, a technical advantage may be that certain embodiments provide lean and efficient means for configuration of measurement gaps that smoothly follow the dynamically adaptive SMTC windows and thus the arrival times of SSB transmissions (or other reference signals) from neighbor cells on which the UE may measure.

Other advantages may be readily apparent to one having skill in the art. Certain embodiments may have none, some, or all of the recited advantages.

BRIEF DESCRIPTION OF DRAWINGS

For a more complete understanding of the disclosed embodiments and their features and advantages, reference is now made to the following description, taken in conjunction with the accompanying drawings, in which.

DETAILED DESCRIPTION

Figure 1:
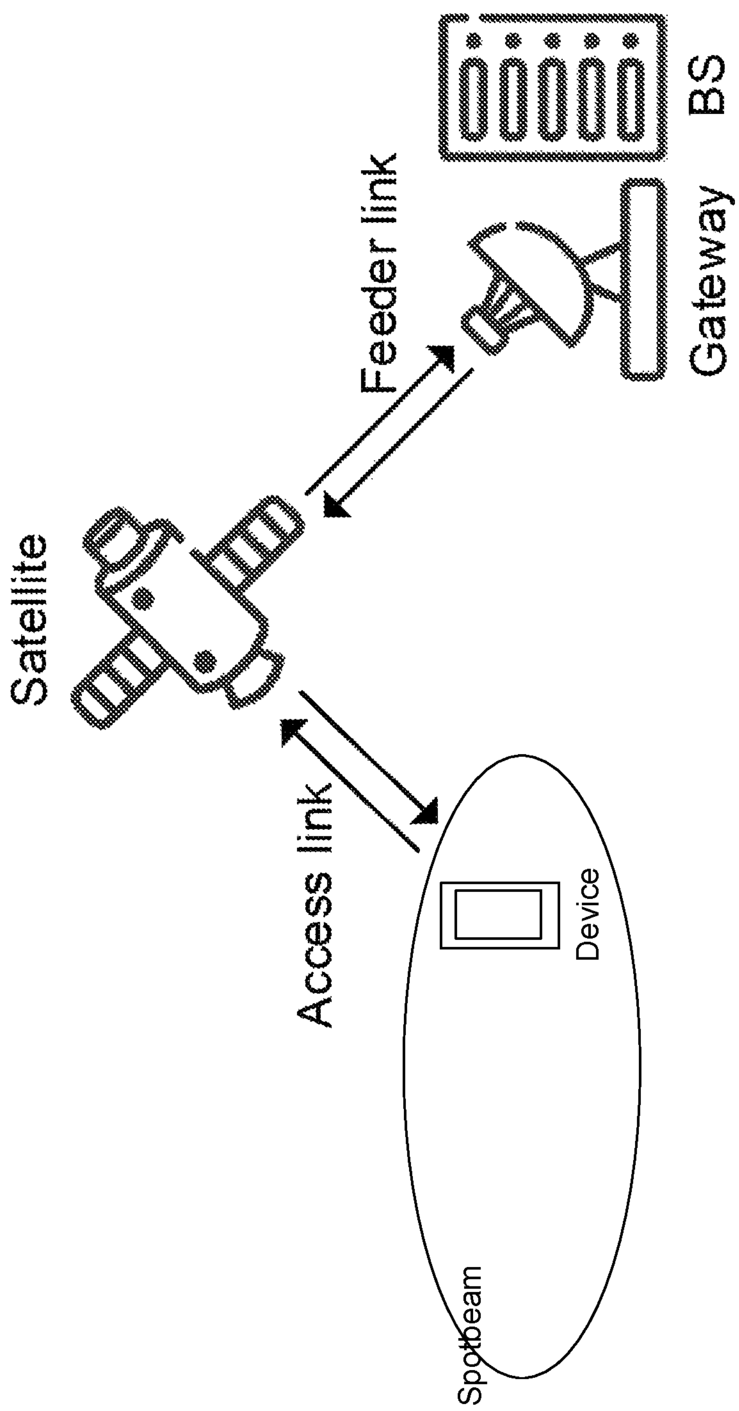
FIG. 1 illustrates an example architecture of a satellite network with bent pipe transponders.
Figure 2:
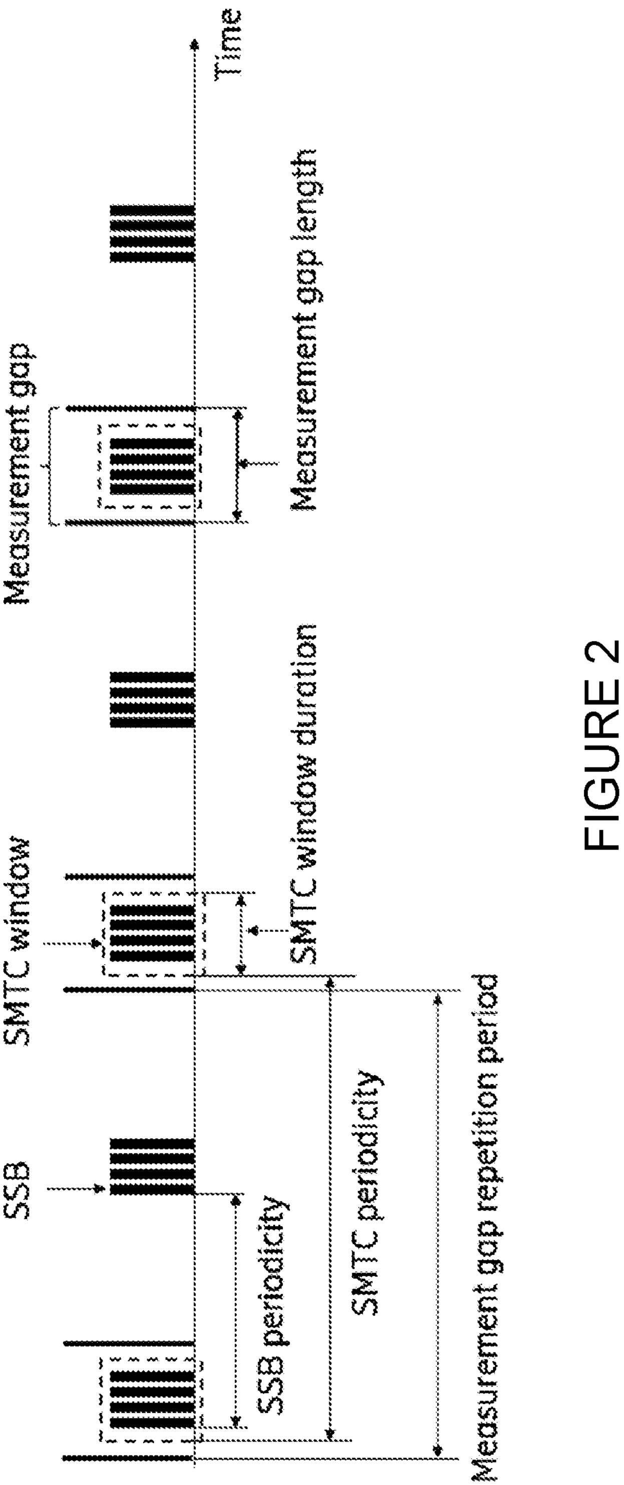
FIG. 2 illustrates an example of SSB, SMTC window, and measurement gap.
Figure 3:
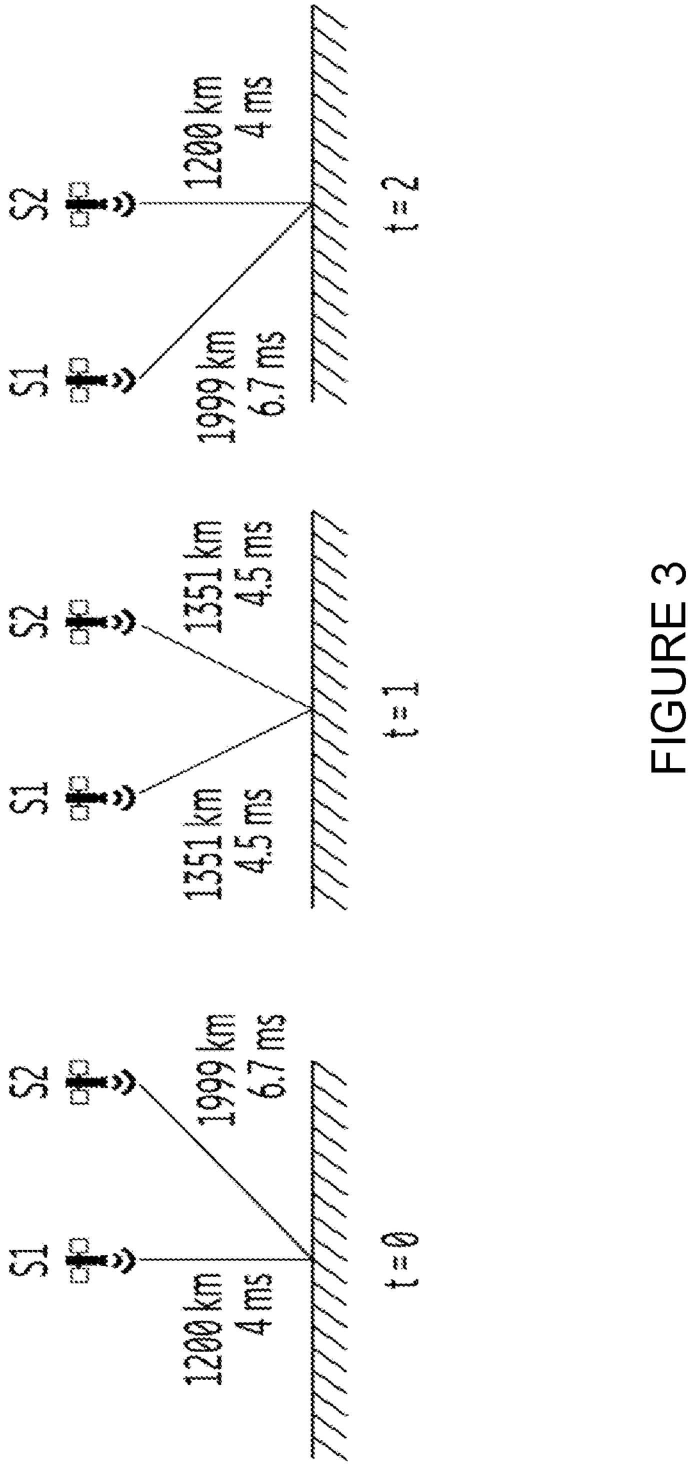
FIG. 3 illustrates propagation delay differences.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Although particular problems and solutions may be described using new radio (NR) terminology, it should be understood that the same solutions apply to long term evolutions (LTE) and other wireless networks as well, where applicable.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

The embodiments outlined below are described mainly in terms of NR based non-terrestrial networks (NTNs), but they are equally applicable in a NTN based on LTE technology or any other radio access technology (RAT) where measurement windows and gaps may be configured.

Particular embodiments include configuration of dynamically adaptive SMTC windows and implicit configuration of corresponding measurement gaps. This is based on that both the UE and the serving gNB have sufficient information/knowledge to continuously track/calculate the time of the measurement (from the UE perspective) and the measurement gap (from the serving gNB's perspective). The UE is informed of the ephemeris data of the neighbor satellite and the location of the neighbor gateway/gNB (or information about how the feeder link propagation delay changes over time) so that the UE, together with its own location, can calculate the signal delay between the neighbor gNB and the UE. The serving gNB knows the same information as the UE about the neighbor cell/satellite/gateway/gNB and the UE's location. Thus, the UE informs the serving gNB of the UE's location.

In particular embodiments, the explicit configuration is replaced by an implicit configuration tied to the SMTC windows to simplify the measurement gap configuration and the complicated time-based adaptations to the changes of the involved propagation delays. To this end, the serving gNB commits to refraining from scheduling the UE during all or a subset (e.g. every second or every third) of the recurring SMTC windows.

In general, a network node (e.g., gNB) in a non-terrestrial network implicitly configures measurement gaps for a UE to use to measure on reference signals in neighbor cells, wherein the measurement gaps are associated with and/or tied to SMTC windows that are configured to allow independent autonomous adaptation over time by the UE and the network node based on satellite ephemeris data, feeder link information (from which the propagation delay can be derived), and potentially the UE's location.

In some embodiments, when the network node configures the UE with SMTC windows and measurement gaps, it may request the UE to send its location to the network node in response. In that procedure, time flexibility is provided to allow the UE to perform a GNSS measurement (if needed) before the UE sends its location in response to the network node.

There are, proposed herein, various embodiments which address one or more of the issues discussed above.

Particular examples focus on SMTC and SMTC window configuration and corresponding measurement gaps, but embodiments are equally applicable if the SMTC configuration is replaced by Received Signal Strength Indicator Measurement Timing Configuration (RMTC) or measurement timing configuration for any other reference signal or other type of measurable signal (e.g., a signal suitable for channel quality measurement).

The measurement gap mechanisms for RRC_CONNECTED state have to be redesigned for NTN, not only to accommodate that the propagation delay between the PCell (serving gNB) and the neighbor cell (neighbor gNB) may differ greatly, but also that these propagation delays and their relative difference changes continuously over time. Mechanisms that take this into account and allow consistent and correct views in the UE and the serving gNB about when the UE should measure and when the serving gNB should refrain from scheduling the UE, without requiring frequent updates to step-wise take the changes into account, have to be based on that both the UE and the serving gNB have sufficient information/knowledge to continuously track/calculate the time of the measurement (from the UE perspective) and the measurement gap (from the serving gNB's perspective). This requires that the UE is informed of the ephemeris data of the neighbor satellite and the location of the neighbor gateway/gNB (or information about how the feeder link propagation delay changes over time such as, for example, in the form of a mathematical time function describing the propagation delay between the neighbor gNB and the neighbor satellite). Based on this information and together with its own location, the UE can calculate the signal delay between the neighbor gNB and the UE.

The serving gNB knows the same information as the UE about the neighbor cell/satellite/GW/gNB and the UE's location. Thus, the UE may inform the serving gNB of the UE's location (unless the network can obtain this information through other, e.g., network-based means). Depending on the time reference used for the SMTC and/or measurement gap configuration, the UE may also know the ephemeris data of its serving satellite (or at least location of the satellite at the time of the configuration) and, in transparent payload (bent pipe) deployment scenario, possibly the location of the gateway/gNB or the propagation delay of the feeder link between the serving gNB and the serving satellite.

When all this information provisioning is in place, there are different options for the time reference for the SMTC window. The easiest option may be to configure the SMTC window based on the time of the neighbor gNB, expressing the window in GNSS time (i.e., the reference time obtained from GNSS signals). Essentially, the UE is informed of the neighbor gNB's timing for its SSB transmissions. Because both the UE and the gNB have enough information to translate the neighbor gNB's time into its own time, this allows the UE to measure during the correct time windows and allows the serving gNB to refrain from scheduling the UE during the correct time window.

In particular embodiments, another option is to configure the SMTC window based on the PCell timing. But note that this would then only be a snapshot, and both the UE and the gNB would have to translate what this means in terms of the neighbor gNB time so that the continuous changes thereafter can be tracked/calculated.

In particular embodiments, yet another option is to base the SMTC configuration on the UE's time. Again, both the UE and the serving gNB then have to translate this into the neighbor gNB's time to be able to thereafter track and/or calculate the continuous changes.

In still other embodiments, another option is to base the SMTC configuration/window on the timing of a selected point on the surface of the earth such as, for example, a selected point near the country border. Although such a choice might complicate the calculation, the extra efforts are not extraordinary given that the GNSS time is already in place. The benefits of such a choice could be to comply with the local regulation and simplify the procedure/criteria for the compliance.

One example could be that, by local regulation, a UE in one country may not be allowed to connect to certain satellites that are linked to ground stations in another country. Stopping such connection attempts from the very beginning would save both UE energy and the precious (time/frequency/power) resources available for each satellite.

When the configuration is based on the timing of the specifically selected point, a message with simple timing criterion such as, for example, a threshold, can be appended to the configuration message so that for UEs whose converted time of SMTC configuration is beyond or below the criterion/threshold will not use the configuration in order to fulfill legal requirements. The motivation of this option is that UEs from different countries could be covered by a single satellite beamspot/cell with large size. A UE can adapt the timing of its local time to the selected timing and thereby distribute the computing complexity to UEs (rather than doing it in a centralized manner).

Of the above time reference options, using the GNSS time has the advantage that it makes the UE operation, as well as the serving gNB's operation slightly less demanding because the UE does not have to convert PCell time to candidate cell time and the serving gNB does not have to convert candidate cell time to PCell time. On the other hand, it requires the UE to have an accurate perception of the GNSS time, but because the UE has to have a reasonably good perception of its location anyway (based on GNSS measurements), it can be assumed that the UE also has a reasonably good perception of the GNSS time.

According to certain embodiments, the above described configuration may be applied per neighbor satellite such as, for example, identified as a set of cells served by the satellite, e.g. identified through their PCIs or a potentially introduced satellite identifier (which may be broadcast in each cell a satellite serves). If each satellite uses its own carrier frequency, a configuration per satellite may be equivalent to a configuration for each carrier frequency, e.g. an SMTC configuration for each carrier frequency. If multiple neighbor satellites are relevant, this will result in multiple SMTC windows which may or may not partially overlap and which may drift in relation to each other over time.

For cases where the accurate UE position is unknown to the network, the network may apply margins on the SMTC window(s) and the measurement gaps to accommodate the entire "uncertainty area" within which the UE may be located, potentially the entire cell. If the UE's accurate location is (assumedly temporarily) unknown to the UE too, the UE may apply similar margins when calculating the time windows within which to perform measurements (see above).

In some embodiments, a common time window (with respect to all cells, e.g. within a tracking area, based on for example GNSS time) is configured, assuming that it is feasible for the cells to have an additional SSB transmission that falls in that common time window, e.g., in a tracking area, so that UEs can be configured with such common SMTC window to monitor to acquire the relevant information. Typically, such a common time window is configured on a rather less frequent basis with respect to the periodicity of SSB transmission in such cells. In such a common time window, the SSB transmissions from different cells can be provided in a way to avoid any overlap. In some embodiments, this may be achieved with offsets with respect to the starting point for the common time window which can be provided to the UE as part of the configuration.

With further regards to the measurement gap configuration, there are different possible options for the configuration and the time reference. In one sense it is suitable to define a measurement gap referring to the PCell frame/slot/symbol structure (because it makes it very clear to the UE whether a certain symbol is inside or outside of the gap), but because the appropriate/optimal time location of the measurement gap shifts/slides/drifts with the satellite movements, such a measurement gap definition/configuration based on the PCell frame/slot/symbol structure would only be valid momentarily at one point in time.

Thus, it may be better to skip the explicit measurement gap configuration altogether, according to certain embodiments. Instead, the network gives the UE the SMTC window(s) and the ephemeris data of the concerned candidate satellite(s), and the UE autonomously adapts the timing of the SMTC window(s) based on the received ephemeris data and its own location (as described above). Then, it is the serving gNB's responsibility to match the sliding/drifting SMTC window(s) with its measurement gap(s). For example, at any given time, the serving gNB should refrain from scheduling the UE if the UE may be occupied by measurements in an SMTC window at that point in time (i.e., both the UL/DL scheduling allocation DCI and the allocated resource (and possible HARQ feedback resource allocation) must avoid the potential UE measurement periods). This may be referred to as implicit measurement gap configuration.

Note that the sliding SMTC window(s) will typically not be aligned with the frame/slot/symbol structure of the PCell (because they are sliding in relation to each other), so the serving gNB may apply a small margin to its measurement gap. Applying such a margin may be good in general such as, for example, to allow for UE movements which the serving gNB are not informed of and which, thus, will make the serving gNB's perception of the UE's measurement periods slightly incorrect. The margin may also be good to give the UE some time to reconfigure its receiver when switching between receiving the serving satellite's signals and a neighbor satellite's signals (i.e., a signal to be measured), or switching from reception of one neighbor satellite's signals to reception of another neighbor satellite's, where such receiver reconfiguration may consist of change the receiver beam and/or retuning the receiver frequency and/or reception filters.

In accordance with the above proposed implicit measurement gap configuration, in some embodiments, the serving gNB may indicate in configuration data provided to the UE that for periodic SMTC window X, the network will refrain from scheduling the UE during every second occurrence of the SMTC window. This may be generalized to every $N^{th}$ SMTC window occurrence or the ones of the periodic SMTC window occurrences that are covered by measurement gaps may be indicated by a mask such as, for example, in the form of a bit map where each bit represent an SMTC window occurrence. For example, a bit set to 1 means that the corresponding SMTC window occurrence is covered by a measurement gap while a bit set to 0 means that the SMTC window occurrence is not covered by a measurement gap. Such a mask may be applied in a periodic manner to the SMTC window occurrences, thereby enabling more complex repetitive measurement gap patterns than the plain $N^{th}$ SMTC occurrence pattern, preferably with an indication included in the configuration of where in the periodic SMTC window sequence (i.e. at which SMTC window occurrence) the application of the first mask should be applied (i.e. it should be clear which SMTC window occurrence the first bit of the first application of the mask corresponds to).

In this indication, an offset may be used in relation to a time reference such as, for example, the PCell time or the GNSS time, or another type of indication of the concerned first SMTC window occurrence, e.g. a GNSS time corresponding to the start of the SMTC window occurrence. The offset indicating at which SMTC window occurrence to start applying the implicit measurement gap configuration may be applicable both when a period mask is applied and when a plain $N^{th}$ SMTC window occurrence configuration is applied (where implicit measurement gap configuration in the form of the $N^{th}$ SMTC window occurrence may be seen as a special case of a periodic mask). If multiple SMTC window configurations are present in parallel (e.g. for different neighbor satellites), there may be a corresponding implicit measurement gap configuration tied to each SMTC window configuration.

In particular embodiments, the SMTC window in the above may be replaced by any kind of reference signal measurement timing configuration window such that the measurement gap configuration is tied to the reference signal measurement timing configuration windows. For instance, the measurement gaps may be implicitly configured to be valid during every $N^{th}$ RMTC window.

This type of implicit configuration facilitates a complex "measurement gap" (or set of measurement gaps) to be implicitly configured, which slides in time depending on satellite movements (and to some extent UE movements) and in which the different measurement gaps may slide in relation to each other over time. This may be a streamlined way to achieve the purpose of measurement gaps, i.e. to allow the UE to know when it can perform neighbor cell measurements without missing any communication in the serving cell.

To do its measurement gap adaptation job properly, the serving gNB has at least a rough notion of the UE's location. It cannot be readily assumed that a NTN gNB always has up to date information about its connected UE's locations. During normal operation, a gNB may be unaware of a connected UE's location or may not know it with good accuracy (because the gNB's information about the UE's location may be old). This may be the situation sometimes or even frequently (it may even be the normal situation).

To handle situations where the gNB is not aware of the UE's location, or has potentially outdated information about the UE's location (i.e. the location information may deviate significantly from the UE's correct location), some embodiments may include an indication in the RRCReconfiguration message that contains the neighbor cell measurement configuration (which includes the SMTC configuration), where this indication could be a request to the UE to include the UE location in the RRCReconfigurationComplete message sent in response to the RRCReconfiguration message.

However, such a request indication could be problematic. If the UE has sufficiently accurate knowledge of its own location (e.g. through a recent GNSS measurement possibly complemented by movement tracking based on an internal accelerometer since the latest GNSS measurement), including this location information in the RRCReconfigurationComplete message is trivial. But, if at the time when it receives the RRCReconfiguration message with the UE location information request, the UE does not have a sufficiently good perception of its location to satisfy the required (or desired) accuracy of the response, the UE first has to perform a GNSS measurement to acquire the accurate location information. On the timescale of NR/LTE control signaling procedures, GNSS measurements are rather time consuming operations and a GNSS measurement will not be fast enough to include the GNSS measurement result in the RRCReconfigurationComplete message before the network has waited so long for the RRCReconfigurationComplete message that it may assume that something has gone wrong.

According to certain embodiments, one way to overcome this problem could be to specify that if the gNB requests the UE to include the UE location in the RRCReconfigurationComplete message, then the gNB should be prepared to wait long enough for the RRCReconfigurationComplete message to give the UE time to perform a GNSS measurement. Alternatively, in other embodiments, the network may configure the UE to measure its position periodically or when a configured timer expires. The network might anyway do that for a purpose other than measurement gaps.

Another possible way is that the UE transmits its latest location estimation plus the time difference between last measurement and the time instant when this message is sent. The gNB can adapt the measurement gaps it applies accordingly, e.g. the measurement gaps would be based on the UE's reported location with margins around the SMTC window(s) which are greater the longer time that has elapsed since the UE acquired the location information it reported.

Other solutions to the problem could be that if the UE does not have an accurate enough perception of its location and has to perform a GNSS measurement before providing its location to the serving gNB, then the UE could still respond immediately with an RRCReconfigurationComplete message, but indicate in this RRCReconfigurationComplete message that it has to perform a GNSS measurement before it can give the gNB the UE location. Then the UE could transmit its location to the serving gNB in a second UL message (maybe a MeasurementReport message or an additional RRCReconfigurationComplete message, or maybe a new message, e.g. an RRC or MAC message, e.g. a new MAC CE for UE location reporting) once the GNSS measurement is concluded. And, if the GNSS measurement fails, the UE can indicate this failure instead of its location in the second message. To provide such location information can be optional so that, if not available, the UE does not indicate the location information in the RRCReconfigurationComplete message.

After receiving the UE's location (or if it had it before), the serving gNB should be able to rely on this location for its calculations of measurement gap adaptations for some time into the future unless the UE is moving at a very high speed. As an option, the gNB may instruct the UE to send another message to the gNB with its location, in case its location changes more than a certain configured distance. This instruction could be included in the RRCReconfiguration message requesting the UE's location or in a message confirming (or at least following) receipt of the UE's location. The configured distance may be included in the instruction or may be configured in the system information or may be specified in a standard specification.

In some embodiments, the network (e.g. the gNB) provides a UE with a measurement gap which the UE is allowed to "steer" in time, that is delay or otherwise adapt a starting offset of a window, or lengthen the window, within certain configured limits. If the UE, due to satellite and/or UE movements need to "steer" the measurement gap beyond the configured limits, it has to inform the network (e.g. the gNB) such as, for example, in the UEAssistanceInformation RRC message.

As an alternative variation, the UE is not allowed to steer the measurement gap but may indicate in the MeasurementReport RRC message (or report to the network in some other way) which measurements it was not able to perform (including measurement filtering) due to that the measurement gap was not appropriately configured. The failed/not performed measurements may be indicated by a cell identifier (e.g. PCI), a reference signal, a MeasId parameter, a MeasObjectId parameter and/or a ReportConfigId parameter, or by another parameter describing the missed measurement. This report may include further information on PCIs the UE was able to detect but not finish the measurement filtering for, or PCIs that were listed in the measurement object, or PCIs the UE knows based on ephemeris should be there, but the UE was not able to detect within the current SMTC or measurement gap configuration. This report may further include the UEs updated location information.

In some embodiments, the network provides a UE with a measurement gap with margins around an SMTC window (or around the union of multiple SMTC windows) and the UE is allowed to "steer" the SMTC window (e.g. based on satellite and/or UE movements) within the measurement gap, but if the UE needs to "steer" the SMTC window beyond the borders of the measurement gap, the UE has to inform the network (e.g. the gNB) such as, for example, in the UEAssistanceInformation RRC message. And as above, as an alternative, or variation, the UE may indicate in the MeasurementReport RRC message (or report to the network in some other way) which measurements it was not able to perform (including measurement filtering) because it would have had to "steer" the SMTC window beyond the borders of the measurement gap, where he failed/not performed measurements may be indicated by a cell identifier (e.g. PCI), a MeasId parameter, a MeasObjectId parameter and/or a ReportConfigId parameter.

In some embodiments, a gNB sends to a UE multiple SMTC window candidates within a measurement gap. The UE chooses, according to its location, one or a subset of such SMTC window candidates and feedback its choices to the gNB. In the feedback message, the UE can include its location information and the corresponding accuracy. After the gNB receives the UE's feedback, the gNB can schedule the measurement gap(s) to cover the selected SMTC window(s) with certain margin. The rest of the SMTC window candidates can be released/freed for data transmission. If the SMTC windows and/or measurement gaps for different UEs overlap, the gNB can reschedule a larger measurement gap to cover SMTC windows/measurement gaps for multiple UEs. Such a solution is adapted uniquely to the satellite communication scenario where the need of having periodical SMTC windows/measurement gaps might be reduced.

Relevant parts of the solution may be applied also for a UE in RRC_IDLE or RRC_INACTIVE state, such as the SMTC window configuration and the ways to continuously adapt it.

Figure 4:
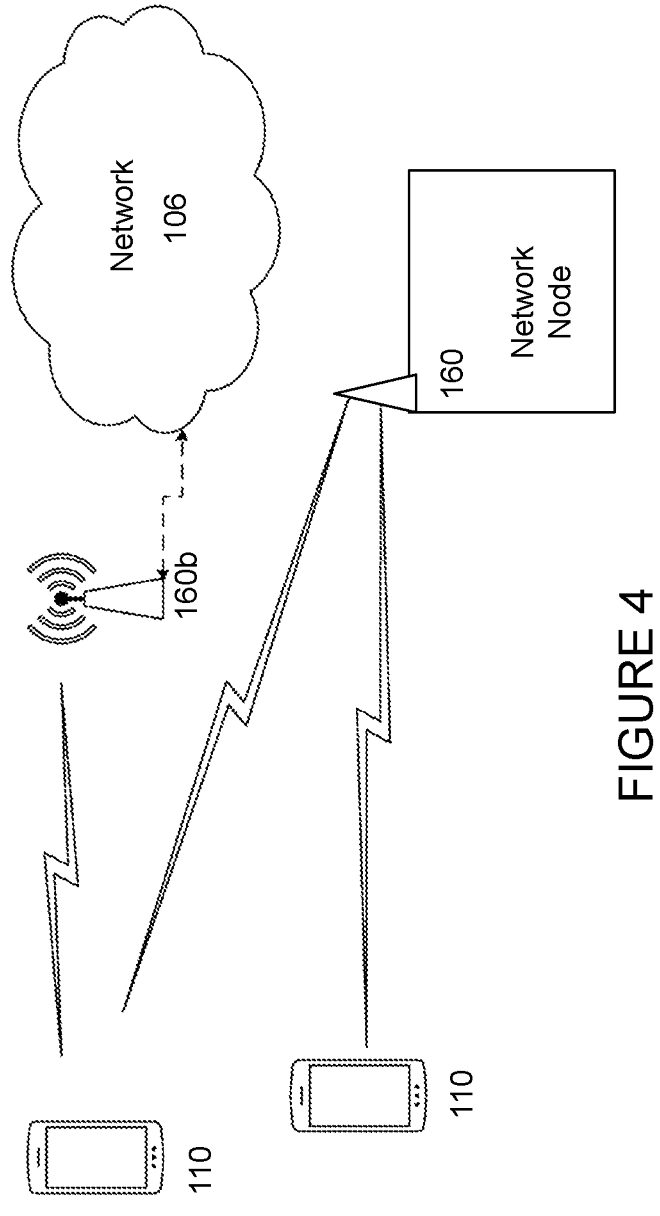
FIG. 4 illustrates an example wireless network, according to certain embodiments.

FIG. 4 illustrates an example wireless network in accordance with some embodiments.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and wireless devices (WDs) 110. In practice, a wireless network may further include any additional elements suitable to support communication between wireless devices or between a wireless device and another communication device, such as a landline telephone, a service provider, or any other network node or end device. Of the illustrated components, network node 160 and WD 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
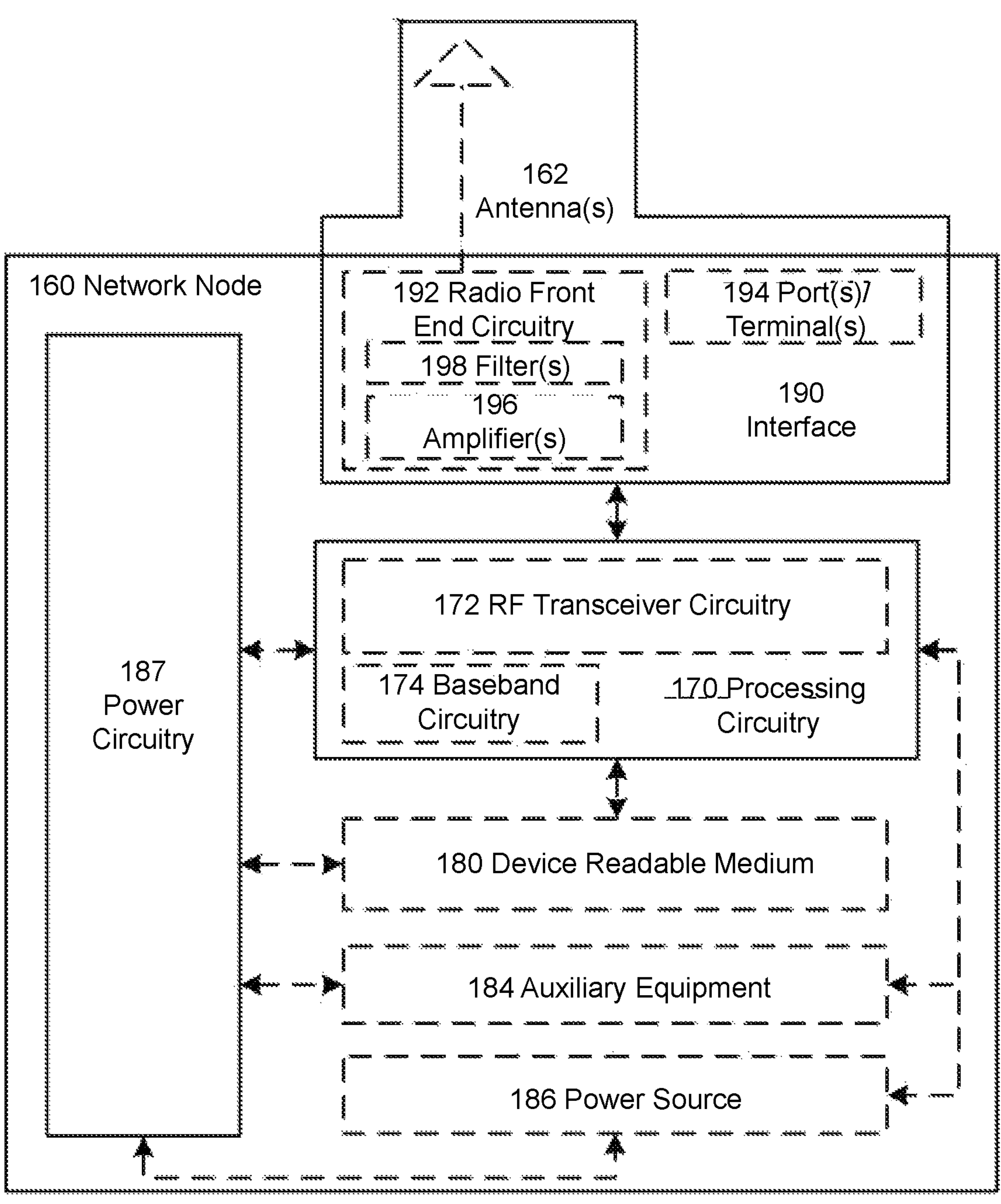
FIG. 5 illustrates an example network node, according to certain embodiments.

FIG. 5 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters

198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
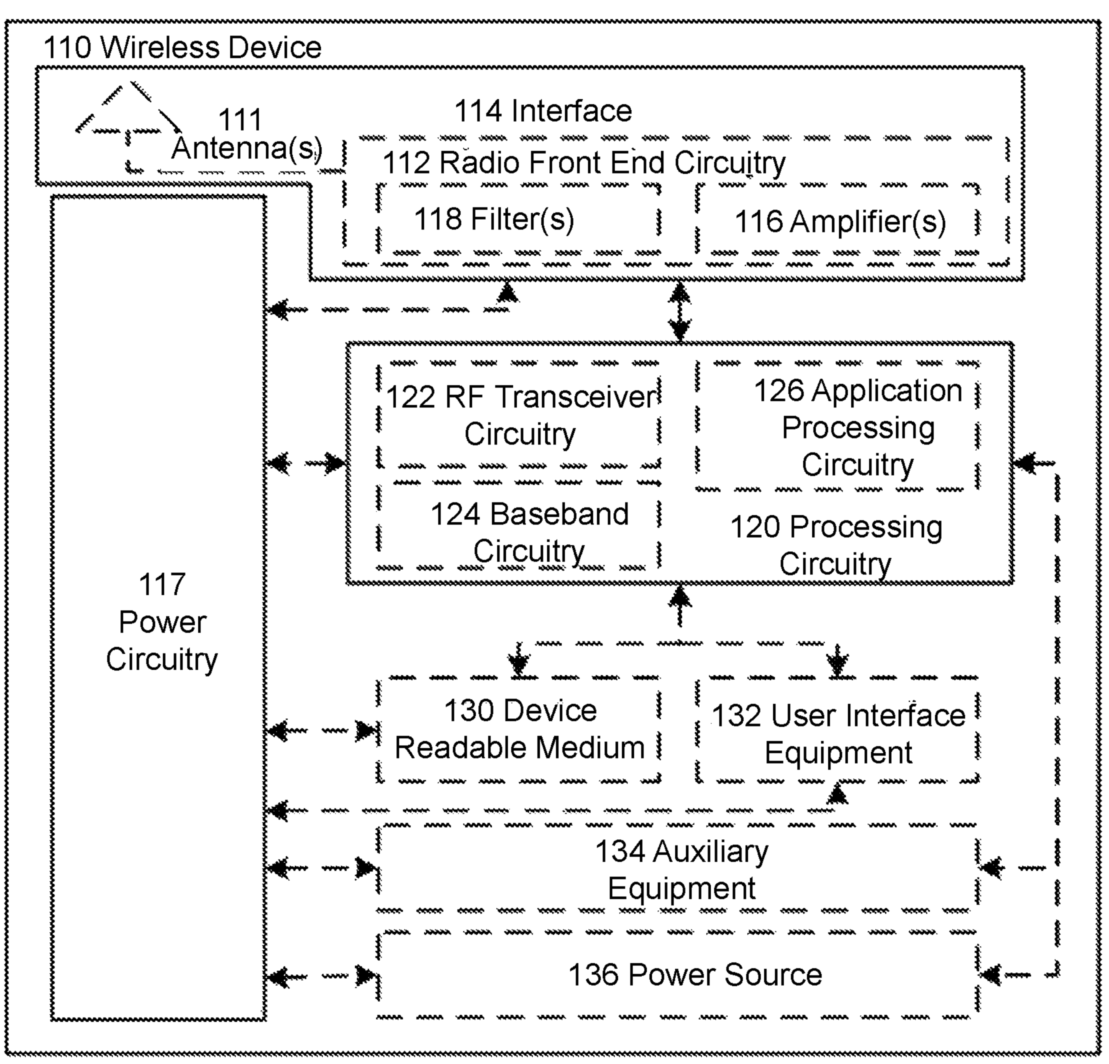
FIG. 6 illustrates an example wireless device, according to certain embodiments.

FIG. 6 illustrates an example WD 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 7:
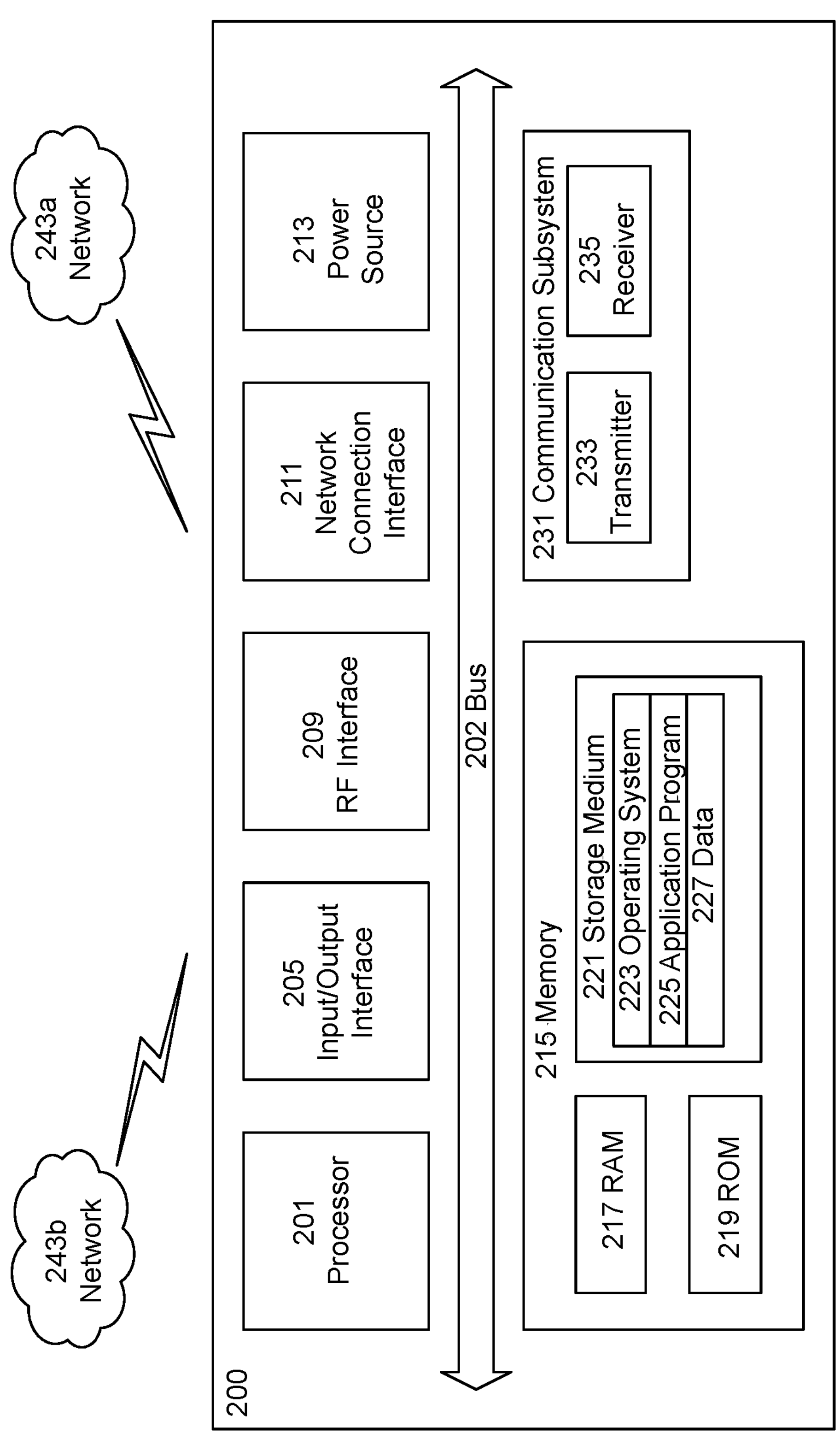
FIG. 7 illustrate an example user equipment, according to certain embodiments.

FIG. 7 illustrates one embodiment of a UE 200, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
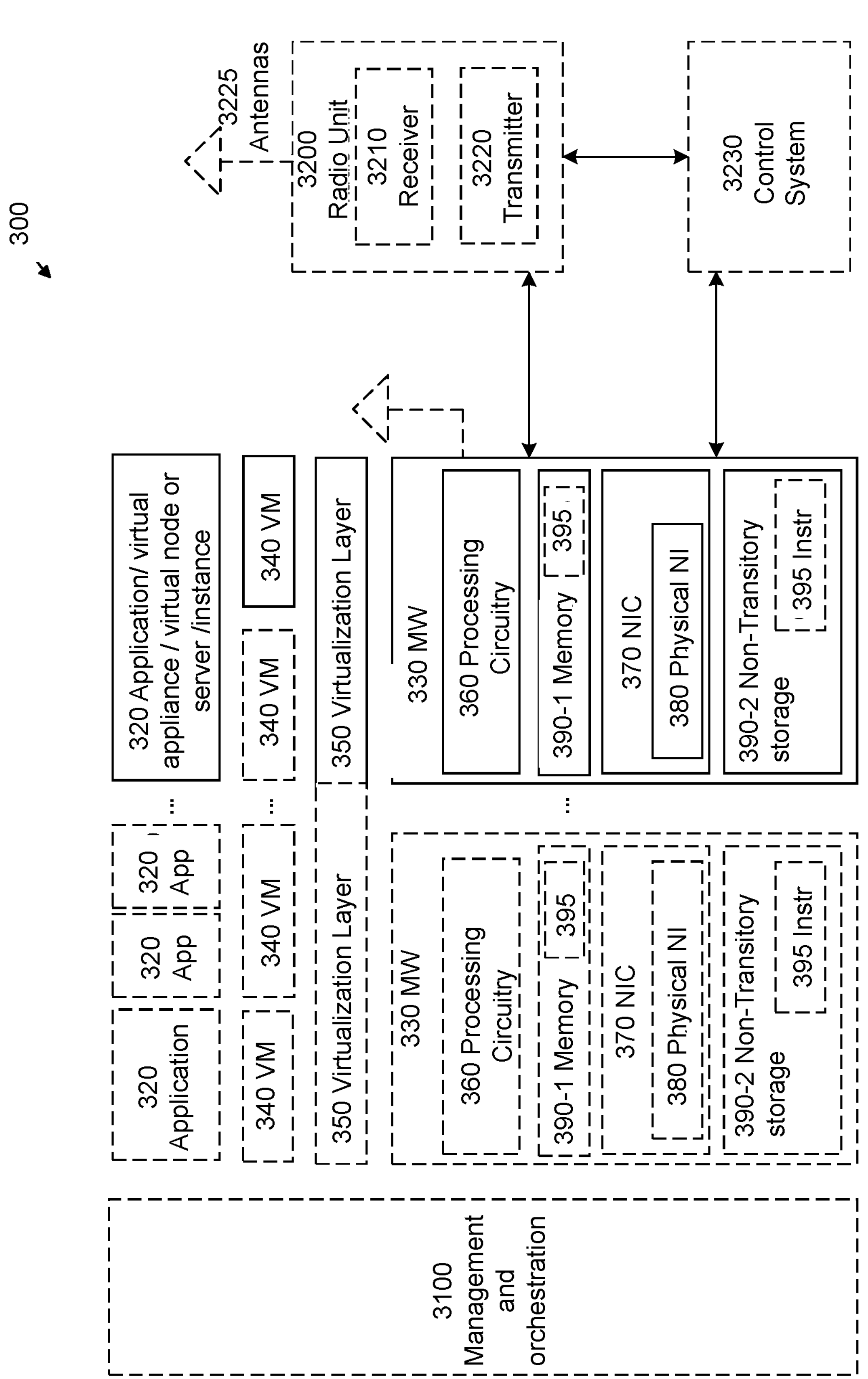
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
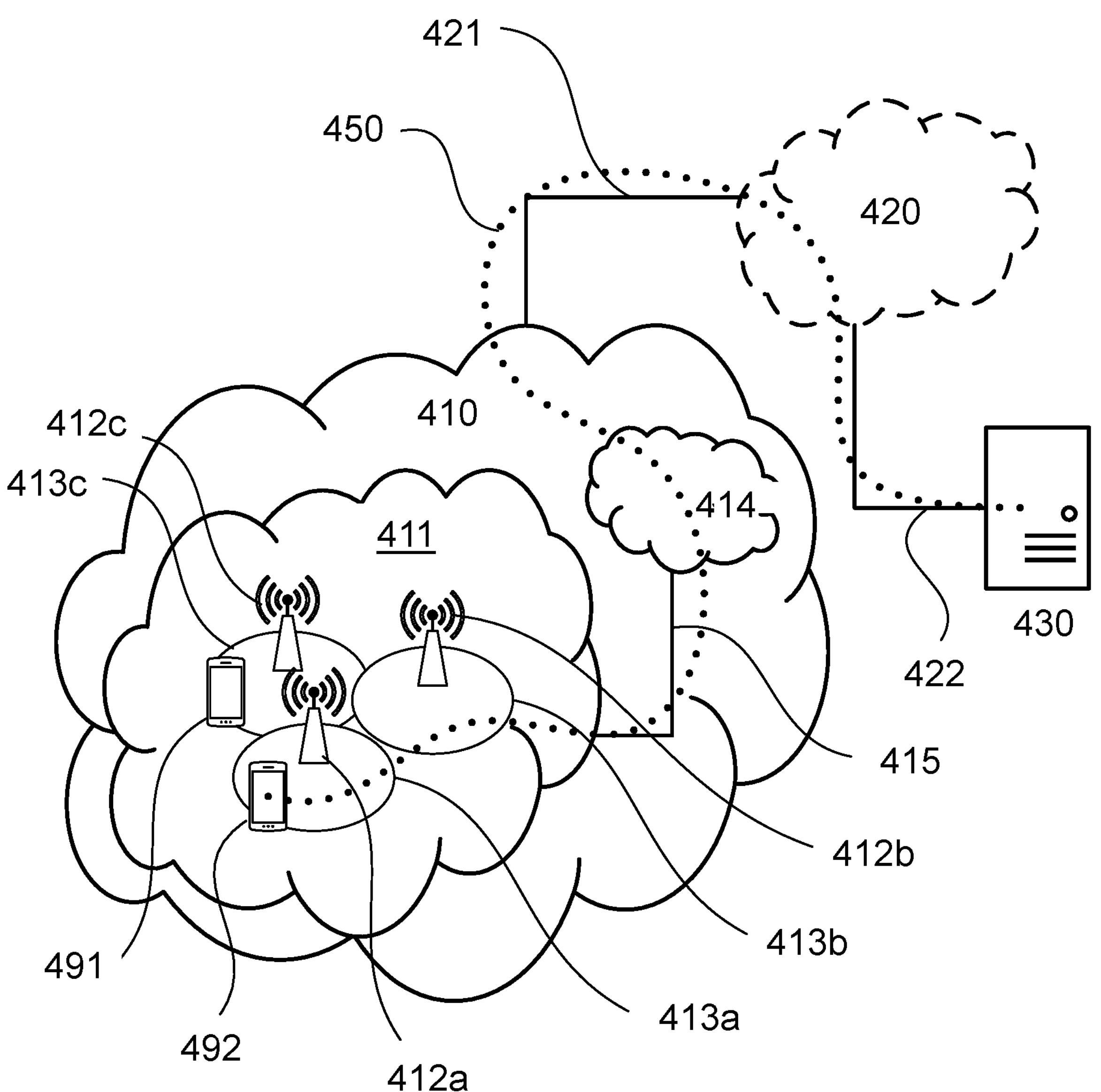
FIG. 9 illustrates a telecommunication network connected via an intermediate network to a host computer, according to certain embodiments.

FIG. 9 illustrates a telecommunication network connected via an intermediate network to a host computer in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
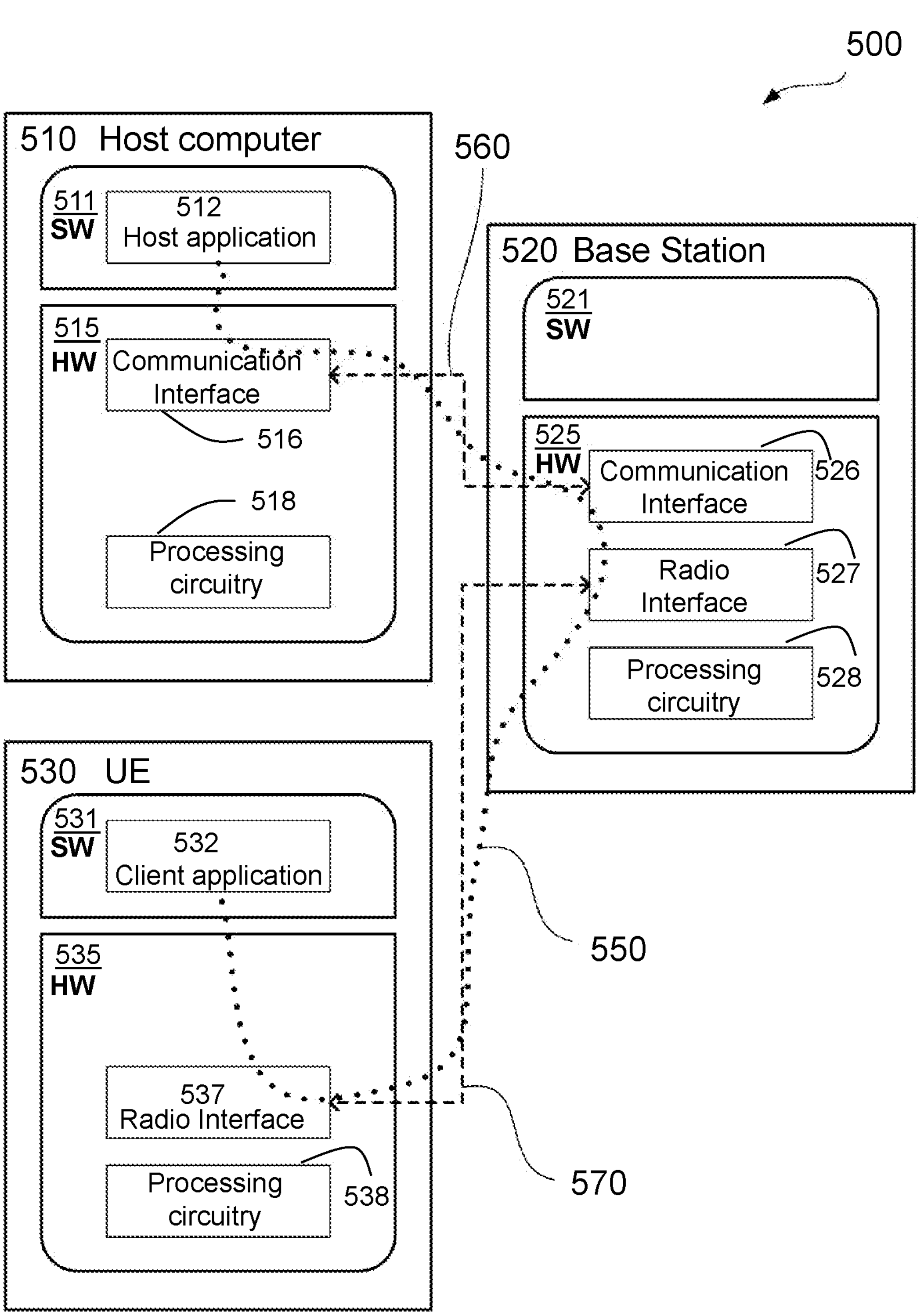
FIG. 10 illustrates a generalized block diagram of a host computer communicating via a base station with a user equipment over a partially wireless connection, according to certain embodiments.

FIG. 10 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412*a*, 412*b*, 412*c* and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 11, 12:
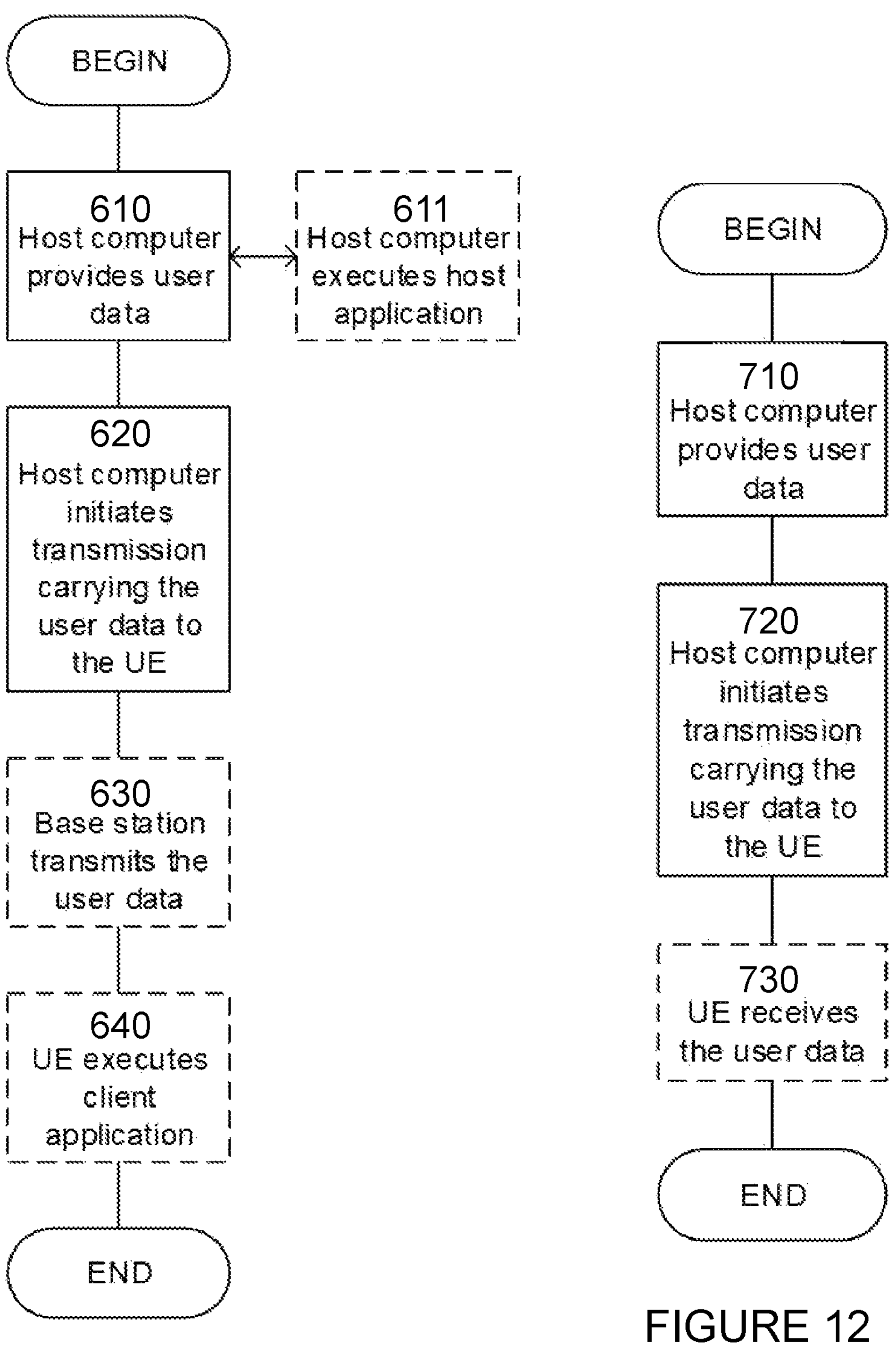
FIG. 11 illustrates a method implemented in a communication system, according to one embodiment.
FIG. 12 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 13, 14:
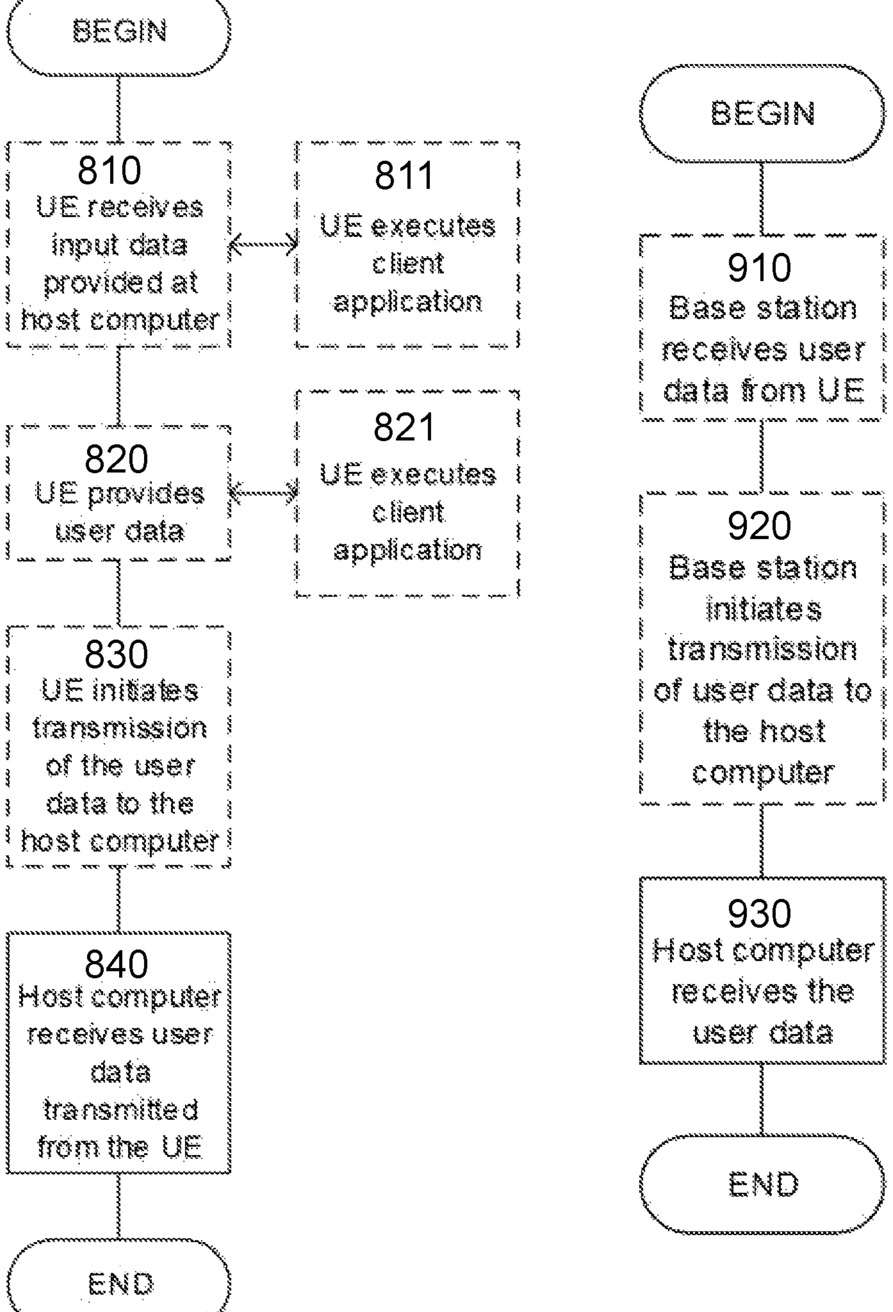
FIG. 13 illustrates another method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 15:
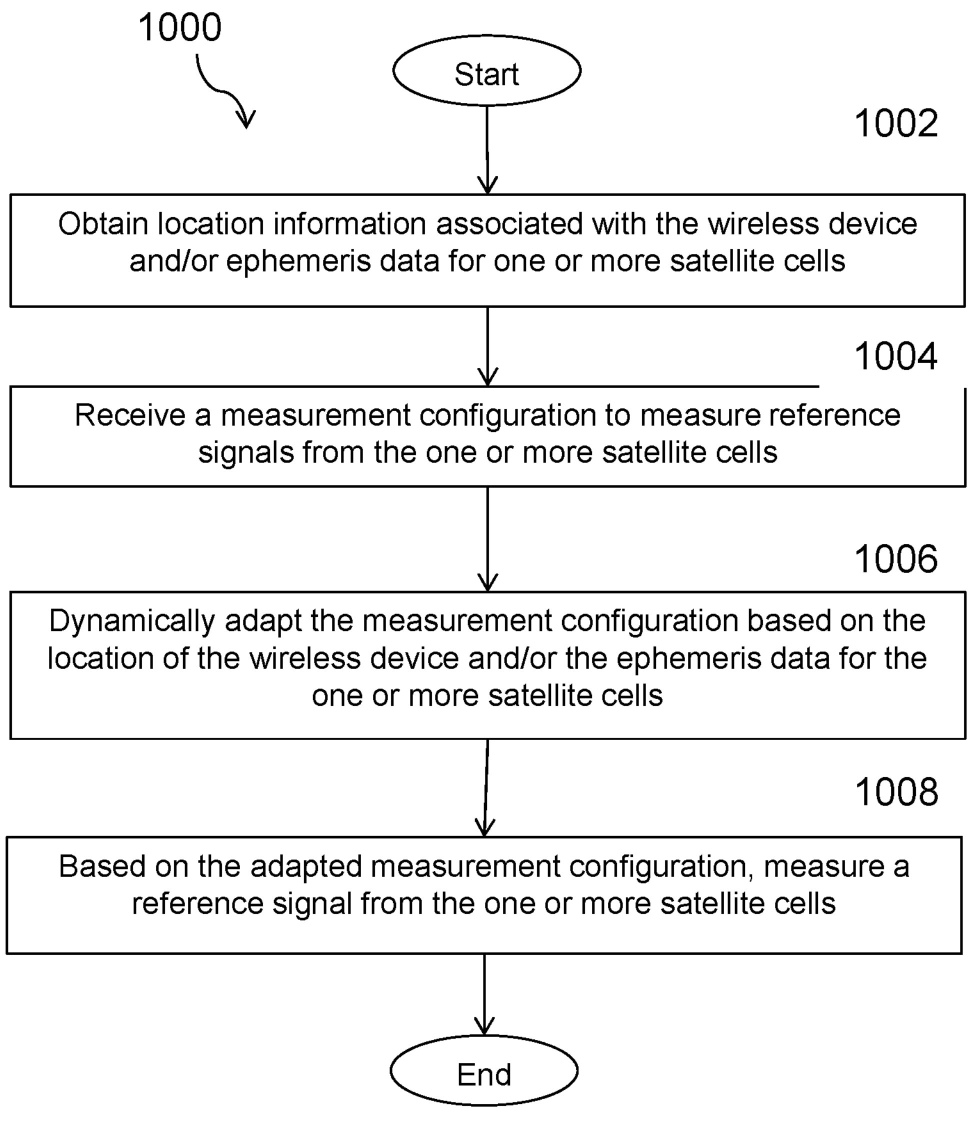
FIG. 15 illustrates an example method by a wireless device, according to certain embodiments.

FIG. 15 illustrates a method 1000 performed by a wireless device 110, according to certain embodiments. The method begins at step 1002 when the wireless device 110 obtains location information associated with the wireless device 110 and/or ephemeris data for a plurality of satellite cells. At step 1004, the wireless device 110 receives a measurement configuration to measure reference signals from one or more satellite cells of the plurality of satellite cells. At step 1006, the wireless device 110 dynamically adapts the measurement configuration based on the location of the wireless device and/or the ephemeris data for the one or more satellite cells. Based on the adapted measurement configuration, the wireless device 110 measures a reference signal from the one or more satellite cells.

In a particular embodiment, when adapting the measurement configuration, the wireless device 110 adapts a measurement window and/or at least one measurement gap associated with the measurement window. In a further particular embodiment, when adapting the measurement window the wireless device 110 shifts a start time of the measurement window. In a particular embodiment, when adapting the measurement window the wireless device 110 adjusts a length of the measurement window.

In a particular embodiment, the wireless device 110 transmits, to a network node 160, a report indicating the adapted measurement window and/or the adapted at least one measurement gap.

Figure 16:
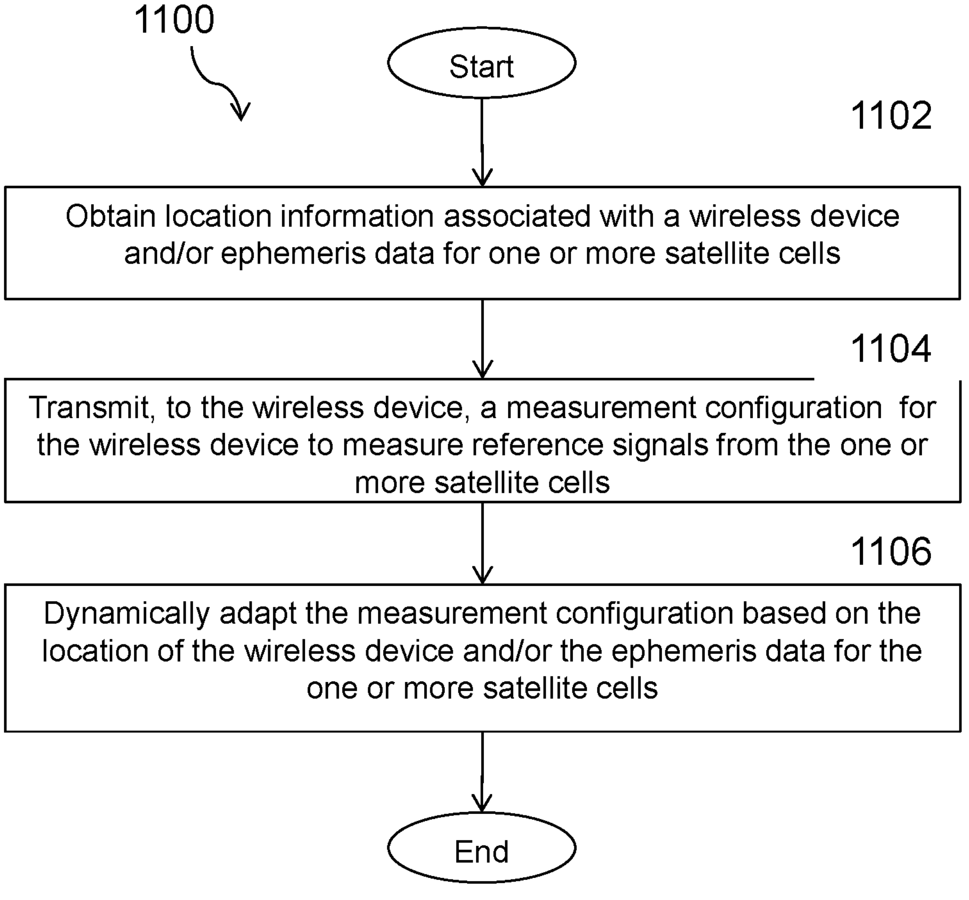
FIG. 16 illustrates an example method by a network node, according to certain embodiments.

In a particular embodiment, the measurement configuration comprises a SMTC and the reference signal comprises a SSB. FIG. 16 illustrates an example method 1100 by a base station 160, according to certain embodiments. The method begins at step 1102 when the network node 160 obtains location information associated with a wireless device 110 and/or ephemeris data for a plurality of satellite cells. At step 1104, the network node 160 transmits, to the wireless device 110, a measurement configuration for the wireless device to measure reference signals from one or more satellite cell of the plurality of satellite cells. At step 1106, the network node 160 dynamically adapts the measurement configuration based on the ephemeris data for the one or more satellite cells and the location information associated with the wireless device.

In a particular embodiment, the network node 160 schedules or not schedules at least one uplink or downlink transmission for the wireless device 110 based on the adapted measurement configuration. In a particular embodiment, when adapting the measurement configuration the network node 160 adapts a measurement window and/or at least one measurement gap associated with the measurement window. In a further particular embodiment, when adapting the measurement window the network node 160 shifts a start time of the measurement window. In a particular embodiment, when adapting the measurement window the network node 160 adjusts a length of the measurement window.

Example Embodiments

Group A Embodiments

Example Embodiment 1. A method performed by a wireless device, the method comprising: obtaining location and/or ephemeris data for a plurality of satellite cells; receiving a measurement configuration to measure reference signals from one or more satellite cell of the plurality of satellite cells; dynamically adapting the measurement configuration based on a location of the one or more satellite cells; and measuring a reference signal on one or more selected satellite cells.

Example Embodiment 2. The method of the previous embodiments, wherein adapting the measurement configuration comprises adapting a measurement window and associated measurement gaps.

Example Embodiment 3. The method of the previous embodiments, wherein the measurement configuration comprises a SMTC and the reference signal comprises an SSB.

Example Embodiment 4. A method performed by a wireless device, the method comprising: any of the wireless device steps, features, or functions described above, either alone or in combination with other steps, features, or functions described above.

Example Embodiment 5. The method of the previous embodiments, further comprising one or more additional wireless device steps, features or functions described above.

Example Embodiment 6. The method of any of the previous embodiments, further comprising: providing user data; and forwarding the user data to a host computer via the transmission to the base station.

Group B Embodiments

Example Embodiment 7. A method performed by a base station, the method comprising: obtaining location and/or ephemeris data for a plurality of satellite cells; transmitting, to a wireless device, a measurement configuration for the wireless device to measure reference signals from one or more satellite cell of the plurality of satellite cells; and dynamically adapting the measurement configuration based on a location of the one or more satellite cells and the wireless device so as to not schedule uplink/downlink transmissions for the wireless device based on the adapted measurement configuration.

Example Embodiment 8. A method performed by a base station, the method comprising: any of the base station steps, features, or functions described above, either alone or in combination with other steps, features, or functions described above.

Example Embodiment 9. A method performed by a base station, the method comprising: any of the base station steps, features, or functions described above, either alone or in combination with other steps, features, or functions described above.

Example Embodiment 10. The method of the previous embodiments, further comprising one or more additional base station steps, features or functions described above.

Example Embodiment 11. The method of any of the previous embodiments, further comprising: obtaining user data; and forwarding the user data to a host computer or a wireless device.

Group C Embodiments

Example Embodiment 12. A wireless device comprising: processing circuitry configured to perform any of the steps of any of the Group A embodiments; and power supply circuitry configured to supply power to the wireless device.

Example Embodiment 13. A base station comprising: processing circuitry configured to perform any of the steps of any of the Group B embodiments; power supply circuitry configured to supply power to the wireless device.

Example Embodiment 14. A user equipment (UE) comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 15. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Example Embodiment 16. The communication system of the pervious embodiment further including the base station.

Example Embodiment 17. The communication system of the previous 2 embodiments, further including the UE, wherein the UE is configured to communicate with the base station.

Example Embodiment 18. The communication system of the previous 3 embodiments, wherein: the processing circuitry of the host computer is configured to execute a host application, thereby providing the user data; and the UE comprises processing circuitry configured to execute a client application associated with the host application.

Example Embodiment 19. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Example Embodiment 20. The method of the previous embodiment, further comprising, at the base station, transmitting the user data.

Example Embodiment 21. The method of the previous 2 embodiments, wherein the user data is provided at the host computer by executing a host application, the method further comprising, at the UE, executing a client application associated with the host application.

Example Embodiment 22. A user equipment (UE) configured to communicate with a base station, the UE comprising a radio interface and processing circuitry configured to performs any of the previous 3 embodiments.

Example Embodiment 23. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Example Embodiment 24. The communication system of the previous embodiment, wherein the cellular network further includes a base station configured to communicate with the UE.

Example Embodiment 25. The communication system of the previous 2 embodiments, wherein: the processing circuitry of the host computer is configured to execute a host application, thereby providing the user data; and the UE's processing circuitry is configured to execute a client application associated with the host application.

Example Embodiment 26. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Example Embodiment 27. The method of the previous embodiment, further comprising at the UE, receiving the user data from the base station.

Example Embodiment 28. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Example Embodiment 29. The communication system of the previous embodiment, further including the UE.

Example Embodiment 30. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 31. The communication system of the previous 3 embodiments, wherein: the processing circuitry of the host computer is configured to execute a host application; and the UE's processing circuitry is configured to execute a client application associated with the host application, thereby providing the user data.

Example Embodiment 32. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 33. A method implemented in a communication system including a host computer, a base station and a user equipment (UE), the method comprising: at the host computer, receiving user data transmitted to the base station from the UE, wherein the UE performs any of the steps of any of the Group A embodiments.

Example Embodiment 34. The method of the previous embodiment, further comprising, at the UE, providing the user data to the base station.

Example Embodiment 35. The method of the previous 2 embodiments, further comprising: at the UE, executing a client application, thereby providing the user data to be transmitted; and at the host computer, executing a host application associated with the client application.

Example Embodiment 36. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 37. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Example Embodiment 38. The communication system of the previous embodiment further including the base station.

Example Embodiment 39. The communication system of the previous 2 embodiments, further including the UE, wherein the UE is configured to communicate with the base station.

Example Embodiment 40. The communication system of the previous 3 embodiments, wherein: the processing circuitry of the host computer is configured to execute a host application; the UE is configured to execute a client application associated with the host application, thereby providing the user data to be received by the host computer.

Example Embodiment 41. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Example Embodiment 42. The method of the previous embodiment, further comprising at the base station, receiving the user data from the UE.

Example Embodiment 43. The method of the previous 2 embodiments, further comprising at the base station, initiating a transmission of the received user data to the host computer.

The invention claimed is:

1. A method performed by a wireless device, the method comprising:

obtaining location information associated with the wireless device and ephemeris data for one or more satellite cells;

receiving a measurement configuration to measure reference signals from the one or more satellite cells;

dynamically adapting the measurement configuration based on the location of the wireless device and the ephemeris data for the one or more satellite cells;

transmitting, to a network node, a report indicating the adapted measurement configuration; and based on the adapted measurement configuration, measuring a reference signal from the one or more satellite cells.

2. The method of claim 1, wherein adapting the measurement configuration comprises adapting a measurement window and/or at least one measurement gap associated with the measurement window.

3. The method of claim 2, wherein adapting the measurement window comprises shifting a start time of the measurement window.

4. The method of claim 2, wherein adapting the measurement window comprises adjusting a length of the measurement window.

5. The method of claim 1, wherein the measurement configuration comprises a Synchronization Signal Block Measurement Timing Configuration, SMTC, and the reference signal comprises a Synchronization Signal Block, SSB.

6. A method performed by a base station, the method comprising:

obtaining location information associated with a wireless device and ephemeris data for one or more satellite cells;

transmitting, to the wireless device, a measurement configuration for the wireless device to measure reference signals from one or more satellite cells;

receiving, from the wireless device, a report indicating the wireless device adapted the measurement configuration; and dynamically adapting the measurement configuration based on the ephemeris data for the one or more satellite cells and the location information associated with the wireless device.

7. The method of claim 6, further comprising scheduling or not scheduling at least one uplink or downlink transmission for the wireless device based on the adapted measurement configuration.

8. The method of claim 6, wherein adapting the measurement configuration comprises adapting a measurement window and/or at least one measurement gap associated with the measurement window.

9. The method of claim 8, wherein adapting the measurement window comprises shifting a start time of the measurement window.

10. The method of claim 8, wherein adapting the measurement window comprises adjusting a length of the measurement window.

11. A wireless device comprising processing circuitry and a memory, the processing circuitry operable to:

obtain location information associated with the wireless device and/or ephemeris data for one or more satellite cells;

receive a measurement configuration to measure reference signals from the one or more satellite cells;

dynamically adapt the measurement configuration based on the location of the wireless device and/or the ephemeris data for the one or more satellite cells;

transmit, to a network node, a report indicating the adapted measurement configuration; and based on the adapted measurement configuration, measure a reference signal from the one or more satellite cells.

12. The wireless device of claim 11, wherein when adapting the measurement configuration the processing circuitry is operable to adapt a measurement window and/or at least one measurement gap associated with the measurement window.

13. The wireless device of claim 12, wherein when adapting the measurement window the processing circuitry is operable to shift a start time of the measurement window.

14. The wireless device of claim 12, wherein when adapting the measurement window the processing circuitry is operable to adjust a length of the measurement window.

15. The wireless device of claim 11, wherein the measurement configuration comprises a Synchronization Signal Block Measurement Timing Configuration, SMTC, and the reference signal comprises a Synchronization Signal Block, SSB.

16. A base station comprising processing circuitry and a memory, the processing circuitry operable to:

obtain location information associated with a wireless device and/or ephemeris data for one or more satellite cells;

transmit, to the wireless device, a measurement configuration for the wireless device to measure reference signals from one or more satellite cells;

receive, from the wireless device, a report indicating the wireless device adapted the measurement configuration; and dynamically adapt the measurement configuration based on the ephemeris data for the one or more satellite cells and the location information associated with the wireless device.

17. The base station of claim 16, the processing circuitry further operable to schedule or not schedule at least one uplink or downlink transmission for the wireless device based on the adapted measurement configuration.

18. The base station of claim 16, wherein when adapting the measurement configuration the processing circuitry is operable to adapt a measurement window and/or at least one measurement gap associated with the measurement window.

19. The base station of claim 18, wherein when adapting the measurement window the processing circuitry is operable to shift a start time of the measurement window.

20. The base station of claim 18, wherein when adapting the measurement window the to adjust a length of the measurement window.

* * * * *